US012607864B1

(12) United States Patent
Nilles et al.

(10) Patent No.: US 12,607,864 B1
(45) Date of Patent: Apr. 21, 2026

(54) CHARGING AND DATA ACCESS PORT FOR A HEAD-WEARABLE APPARATUS

(71) Applicant: Snap Inc., Santa Monica, CA (US)

(72) Inventors: Gerald Nilles, Los Angeles, CA (US); Ugur Olgun, Marina Del Rey, CA (US); Jordan Wakser, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 18/779,902

(22) Filed: Jul. 22, 2024

Related U.S. Application Data

(60) Provisional application No. 63/529,019, filed on Jul. 26, 2023.

(51) Int. Cl.
| | |
|---|---|
| *G06T 3/40* | (2024.01) |
| *G02B 27/01* | (2006.01) |
| *G06T 19/00* | (2011.01) |
| *H02J 7/00* | (2006.01) |

(52) U.S. Cl.
CPC ...... *G02B 27/0176* (2013.01); *H02J 7/00034* (2020.01); *H02J 7/0044* (2013.01); *G02B 2027/0138* (2013.01); *G02B 2027/0178* (2013.01)

(58) Field of Classification Search
CPC ........ G02B 27/0176; G02B 2027/0138; G02B 2027/0178; H02J 7/00034; H02J 7/0044
See application file for complete search history.

(56) References Cited

U.S. PATENT DOCUMENTS

| | | | | |
|---|---|---|---|---|
| 3,349,352 A | * | 10/1967 | Zandt | H01H 51/287 |
| | | | | 335/154 |
| 10,281,976 B2 | * | 5/2019 | Nishizawa | H04W 4/80 |
| 2016/0370592 A1 | * | 12/2016 | Mak | G06F 3/011 |
| 2019/0079302 A1 | * | 3/2019 | Ninan | G06F 1/163 |
| 2019/0339532 A1 | * | 11/2019 | Chang | G06F 1/163 |
| 2022/0124295 A1 | * | 4/2022 | Canberk | G06V 20/20 |
| 2022/0375028 A1 | * | 11/2022 | Jung | G06F 3/147 |
| 2023/0305301 A1 | * | 9/2023 | Kasar | G02C 5/001 |
| 2024/0257676 A1 | * | 8/2024 | Matsuda | G03H 1/0005 |

* cited by examiner

*Primary Examiner* — Kwang-Su Yang
(74) *Attorney, Agent, or Firm* — SCHWEGMAN LUNDBERG & WOESSNER, P.A.

(57) ABSTRACT

In some examples, a head-wearable apparatus for viewing augmented reality (AR) or virtual reality (VR) content is provided. An example the apparatus comprises a frame, an optical assembly including an image display in which the AR or VR content may be viewed by a user, and a user input device operable by the user to navigate through content viewed in the image display, or to invoke a function of the head-wearable apparatus. The user input device includes a body manually engageable by the user to perform a content navigation or function invocation operation and is configured to present at least one contact for accepting a connection to an external charging source, or a connection to an external device.

18 Claims, 12 Drawing Sheets

CHARGING AND DATA ACCESS PORT FOR A HEAD-WEARABLE APPARATUS

CLAIM OF PRIORITY

This patent application claims the benefit of priority, under 35 U.S.C. Section 119 (e), to Nilles et al, U.S. Provisional Patent Application Ser. No. 63/529,019, entitled "CHARGING AND DATA ACCESS FOR WEARABLE AUGMENTED REALITY DEVICES," filed on Jul. 26, 2023, which is hereby incorporated by reference herein in its entirety.

TECHNICAL FIELD

The present disclosure relates generally to wearable devices, including a head-wearable apparatus for viewing augmented content displayed in a content interaction system, such as an augmented reality (AR) or virtual reality (VR) display. More specifically, the present disclosure relates to systems and methods for providing charging and data access in a head-wearable apparatus. Some examples include navigation push buttons having multi-purpose capability for charging and data access in addition to their navigation functions.

BACKGROUND

AR eyewear devices typically are a type of portable consumer electronics device powered by batteries. The batteries require charging after use. Many electronics devices use standardized charging ports, such as USB-C, to recharge the batteries. These standardized ports necessitate dedicated openings on the housing of the device, taking up very valuable space and creating potential ingress points for humidity and dust to the internals of the device.

Some devices use wireless charging solutions to address these problems but current wireless technology requires relatively large coils, complicated electronics, and a much slower charging experience. Current wireless charging systems are not designed for high speed communications that debug access might require.

Early versions of AR eyewear included custom-made, small charging contacts to deliver a similar charging experience at much smaller space footprint, but these charging contacts had no user navigation capability and did not allow data access. Some smart phones also include a common port for charging and data access, but these ports cannot be used for user navigation of the smart phone. The charging/data access port in any event takes up extra space.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

The present disclosure relates generally to wearable devices, including a head-wearable apparatus for viewing augmented content displayed in a content interaction system. More specifically, the present disclosure also relates to providing charging and data access capability for an augmented reality (AR) or virtual reality (VR) display such as in a heads-up-display or head-wearable apparatus.

Some examples use existing configurations of navigation push buttons as a form factor for providing dual or multi-purpose charging and data access for software updates, debugging, and so forth. Some examples enable a configuration of an existing mechanical component, such as manual navigation button, to provide charging, high speed data and debugging access in seeking to provide, for example, a more fashionable and compact product.

A navigation button enabled in this way may thus have multiple functionality and be used in different modes when mated with a charging or data access cable, for example, as opposed to being pressed on by a user, for example. Some examples herein thereby eliminate the space otherwise needed for a dedicated charging and communications port, such as is needed in a conventional smart phone for example.

In some examples, the multipurpose buttons are made out of ferromagnetic metal (for example, iron) that is coated with highly conductive metal (for example, nickel).

A mating charging and data access cable may include magnets for detachable alignment and retention of the charging and data access connection to a multipurpose button.

Figure 1:
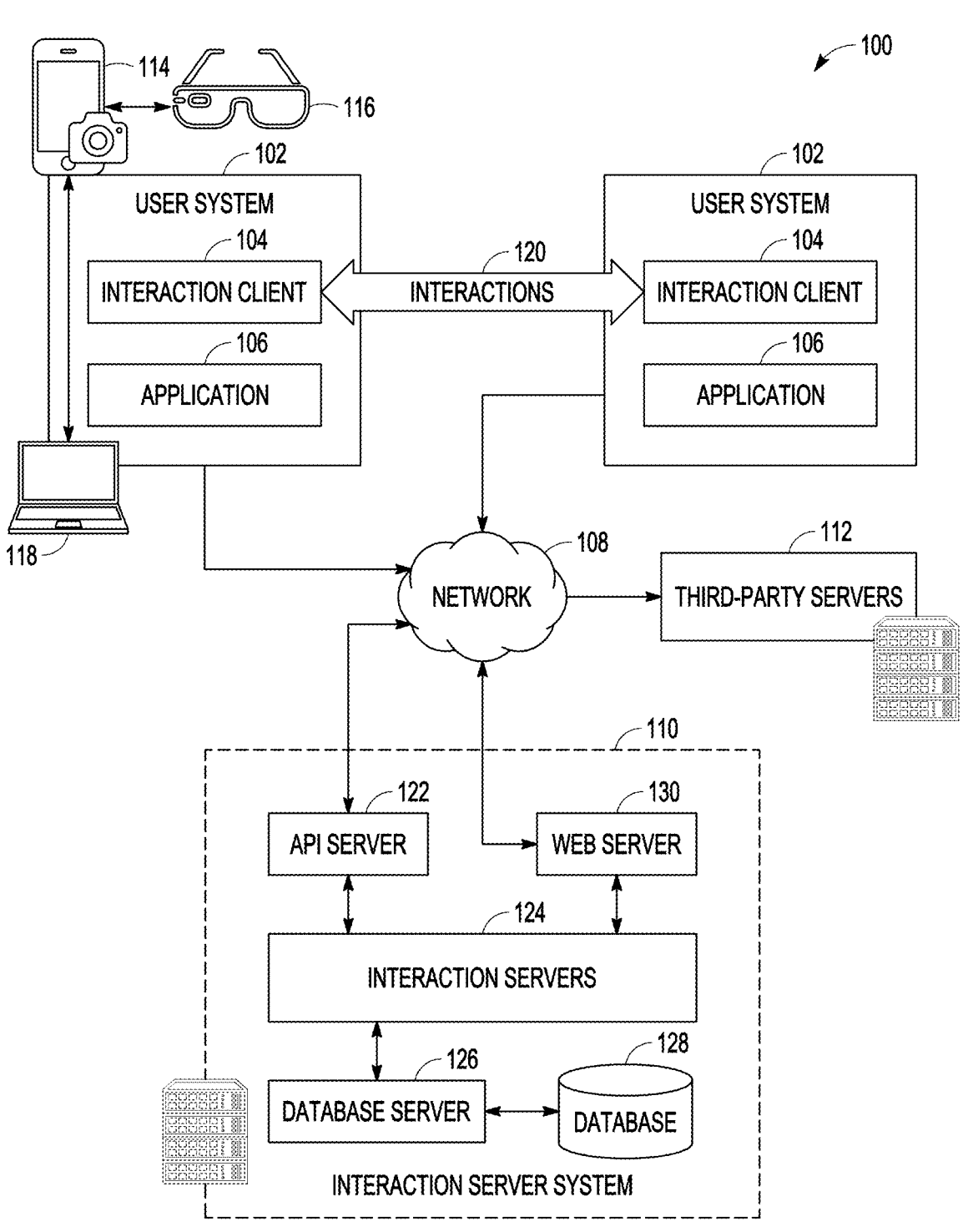
FIG. 1 is a diagrammatic representation of a networked environment in which the present disclosure may be deployed, according to some examples.

The present disclosure relates generally to wearable devices, including a head-wearable apparatus for viewing augmented content displayed in a content interaction system. More specifically, the present disclosure also relates to providing charging and data access capability for an augmented reality (AR) or virtual reality (VR) display such as in a heads-up-display or head-wearable apparatus.
Networked Computing Environment FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
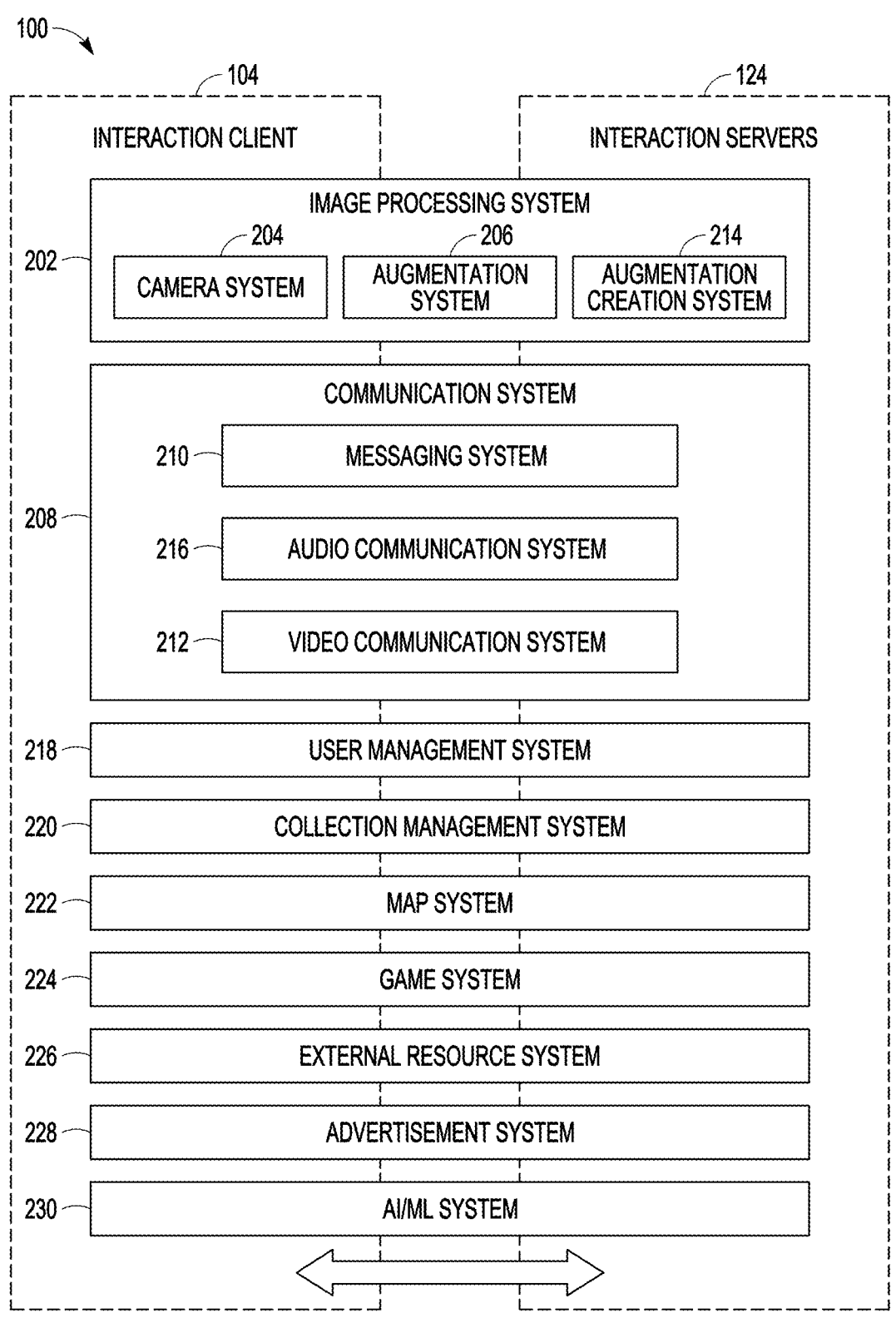
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 502 of a user system 102. These augmentations are selected by the augmentation system 206 and presented to a user of an interaction client 104, based on a number of inputs and data, such as for example:

Geolocation of the user system 102; and.

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 May launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
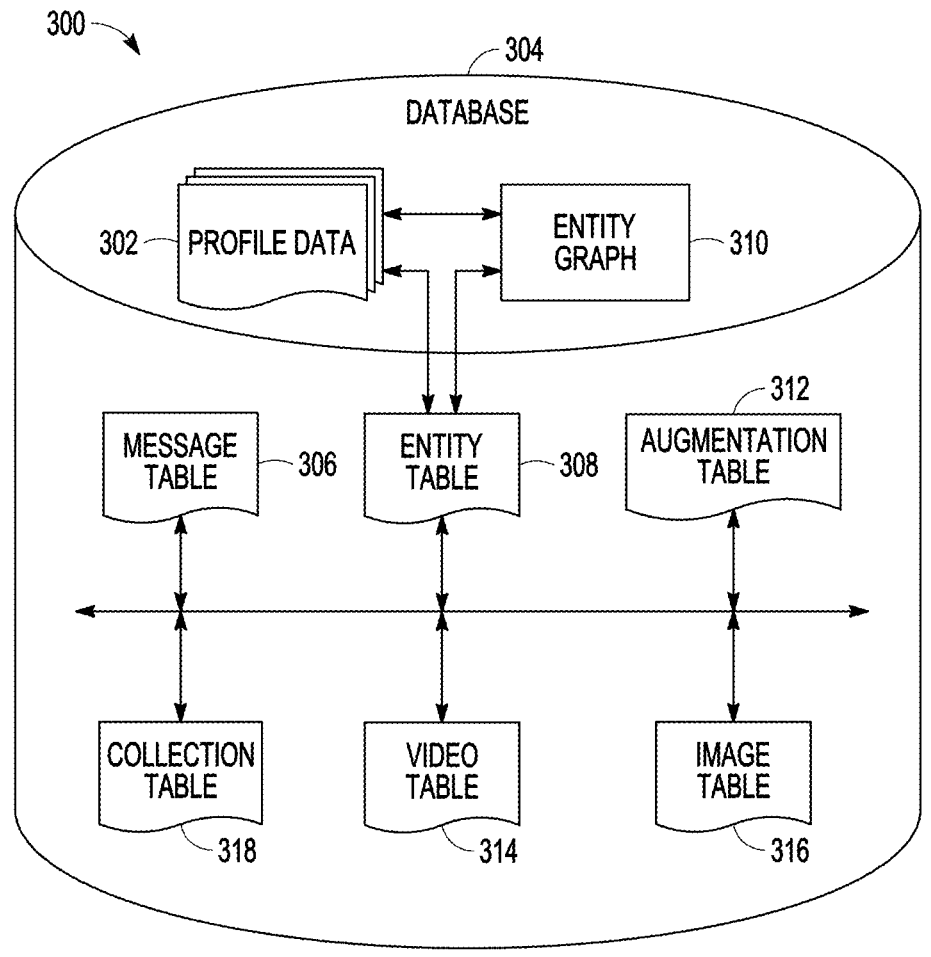
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
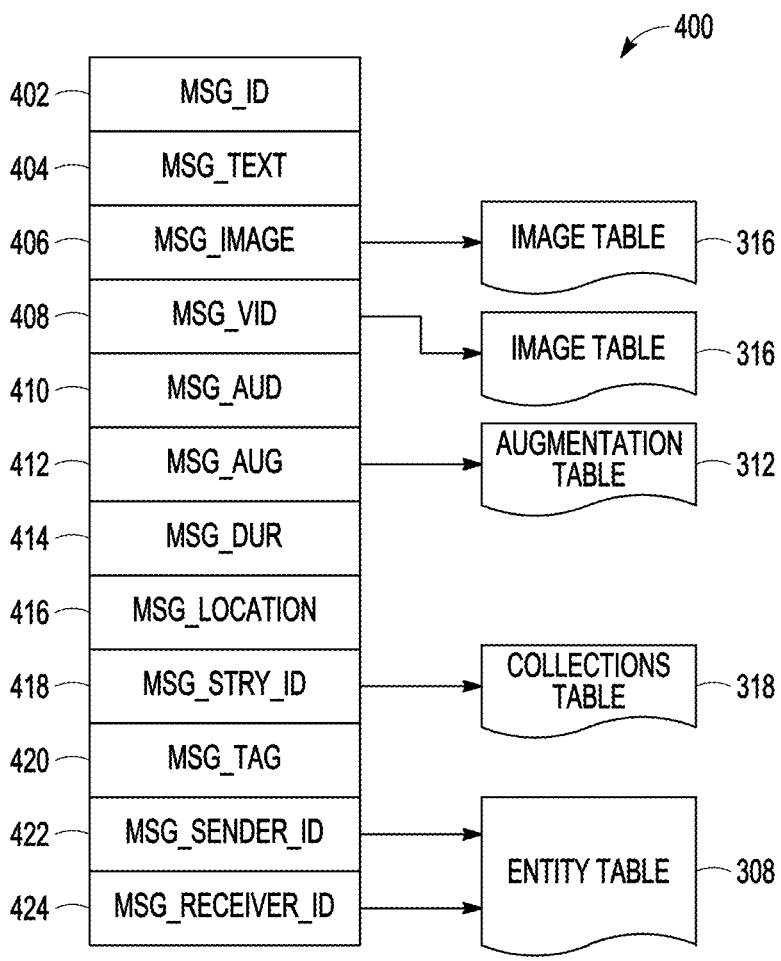
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values. · Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

System with Head-Wearable Apparatus

Figure 5:
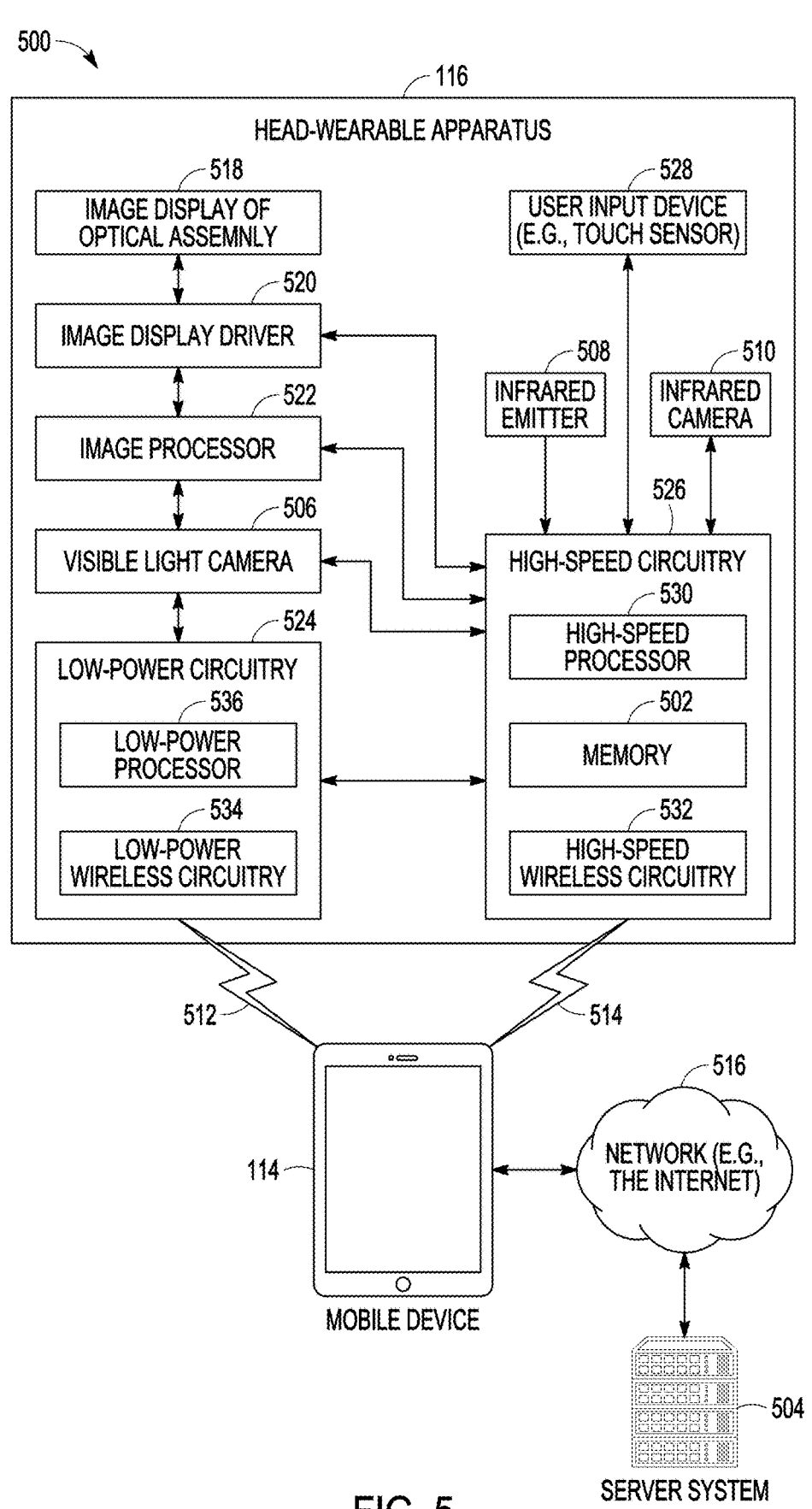
FIG. 5 illustrates a system in which the head-wearable apparatus can be used, according to some examples.

FIG. 5 illustrates a system 500 including a head-wearable apparatus 116 with a selector input device, according to some examples. FIG. 5 is a high-level functional block diagram of an example head-wearable apparatus 116 communicatively coupled to a mobile device 114 and various server systems 504 (e.g., the interaction server system 110) via various networks 108.

The head-wearable apparatus 116 includes one or more cameras, each of which may be or include, for example, a visible light camera 506, an infrared emitter 508, and an infrared camera 510.

The mobile device 114 connects with head-wearable apparatus 116 using both a low-power wireless connection 512 and a high-speed wireless connection 514. The mobile device 114 is also connected to the server system 504 and the network 516.

The head-wearable apparatus 116 further includes two image displays of the image display of optical assembly 518. The two image displays of optical assembly 518 include one associated with the left lateral side and one associated with the right lateral side of the head-wearable apparatus 116. The head-wearable apparatus 116 also includes an image display driver 520, an image processor 522, low-power circuitry 524, and high-speed circuitry 526. The image display of optical assembly 518 is for presenting images and videos, including an image that can include a graphical user interface to a user of the head-wearable apparatus 116.

The image display driver 520 commands and controls the image display of optical assembly 518. The image display driver 520 may deliver image data directly to the image display of optical assembly 518 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes one or more user input devices 528 (e.g., touch sensors or push buttons), including an input surface on the head-wearable apparatus 116. In some examples, the user input device 528 (e.g., touch sensor or push button) is to receive from the user an input selection to manipulate the graphical user interface of the presented image, or in the image display of optical assembly 518.

In some examples, the user input device 528 includes a push button that can be manually depressed or manipulated by a user to invoke a function of the head-wearable apparatus 116, such as to take a picture or video using the head-wearable apparatus 116 by invoking operation of an application or a device of the head-wearable apparatus 116 for example a camera, such as the visible light camera 506, the infrared emitter 508, or the infrared camera 510. Operation of a camera or other navigation in the graphical user interface or image display of optical assembly 518 may be invoked based on a predetermined sequence or pattern of one or more pushes of the user input device 528, or depressing the user input device 528 or a pair of user input devices 528 simultaneously for a predetermined period of time, or longer. Other types of navigations, sequences, and patterns are possible. In some examples, the push button is supported movably on and resiliently biased by an electrically conductive support disposed internally of the head-wearable apparatus. A resiliently biasing electrically conductive support may include a spring contact described further below. The resiliently-biasing electrically conductive support (such as a spring contact for example) is electrically connected to the push button (or at least a body of the push button) and is brought into electrical communication with an external charging source or device when the external charging source or device is connected to the push button (or body thereof). This electrical communication helps to convey a charge or data access connection to a downstream battery or other component of the head-wearable apparatus 116. Some examples are described further below. Other embodiments are possible.

The components shown in FIG. 5 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 506 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 502, which stores instructions to perform a subset or all of the functions described herein. The memory 502 can also include storage device.

As shown in FIG. 5, the high-speed circuitry 526 includes a high-speed processor 530, a memory 502, and high-speed wireless circuitry 532. In some examples, the image display driver 520 is coupled to the high-speed circuitry 526 and operated by the high-speed processor 530 in order to drive the left and right image displays of the image display of optical assembly 518. The high-speed processor 530 may be any processor capable of managing high-speed communications and operation of any general computing system needed for the head-wearable apparatus 116. The high-speed processor 530 includes processing resources needed for managing high-speed data transfers on a high-speed wireless connection 514 to a wireless local area network (WLAN) using the high-speed wireless circuitry 532. In certain examples, the high-speed processor 530 executes an operating system such as a LINUX operating system or other such operating system of the head-wearable apparatus 116, and the operating system is stored in the memory 502 for execution. In addition to any other responsibilities, the high-speed processor 530 executing a software architecture for the head-wearable apparatus 116 is used to manage data transfers with high-speed wireless circuitry 532. In certain examples, the high-speed wireless circuitry 532 is configured to implement Institute of Electrical and Electronic Engineers (IEEE) 802.11 communication standards, also referred to herein as WI-FIR. In some examples, other high-speed communications standards may be implemented by the high-speed wireless circuitry 532.

The low-power wireless circuitry 534 and the high-speed wireless circuitry 532 of the head-wearable apparatus 116 can include short-range transceivers (Bluetooth™) and wireless, local, or wide area network transceivers (e.g., cellular or WI-FI®). Mobile device 114, including the transceivers communicating via the low-power wireless connection 512 and the high-speed wireless connection 514, may be implemented using details of the architecture of the head-wearable apparatus 116, as can other elements of the network 516.

The memory 502 includes any storage device capable of storing various data and applications, including, among other things, camera data generated by the left and right visible light cameras 506, the infrared camera 510, and the image processor 522, as well as images generated for display by the image display driver 520 on the image displays of the image display of optical assembly 518. While the memory 502 is shown as integrated with high-speed circuitry 526, in some examples, the memory 502 may be an independent standalone element of the head-wearable apparatus 116. In certain such examples, electrical routing lines may provide a connection through a chip that includes the high-speed processor 530 from the image processor 522 or the low-power processor 536 to the memory 502. In some examples, the high-speed processor 530 may manage addressing of the memory 502 such that the low-power processor 536 will boot the high-speed processor 530 any time that a read or write operation involving memory 502 is needed.

As shown in FIG. 5, the low-power processor 536 or high-speed processor 530 of the head-wearable apparatus 116 can be coupled to the camera (visible light camera 506, infrared emitter 508, or infrared camera 510), the image display driver 520, the user input device 528 (e.g., touch sensor or push button), and the memory 502.

The head-wearable apparatus 116 is connected to a host computer. For example, the head-wearable apparatus 116 is paired with the mobile device 114 via the high-speed wireless connection 514 or connected to the server system 504 via the network 516. The server system 504 may be one or more computing devices as part of a service or network computing system, for example, that includes a processor, a memory, and network communication interface to communicate over the network 516 with the mobile device 114 and the head-wearable apparatus 116.

The mobile device 114 includes a processor and a network communication interface coupled to the processor. The network communication interface allows for communication over the network 516, low-power wireless connection 512, or high-speed wireless connection 514. Mobile device 114 can further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 520. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 504, such as the user input device 528, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 512 and high-speed wireless connection 514 from the mobile device 114 via the low-power wireless circuitry 534 or high-speed wireless circuitry 532.

Figure 6:
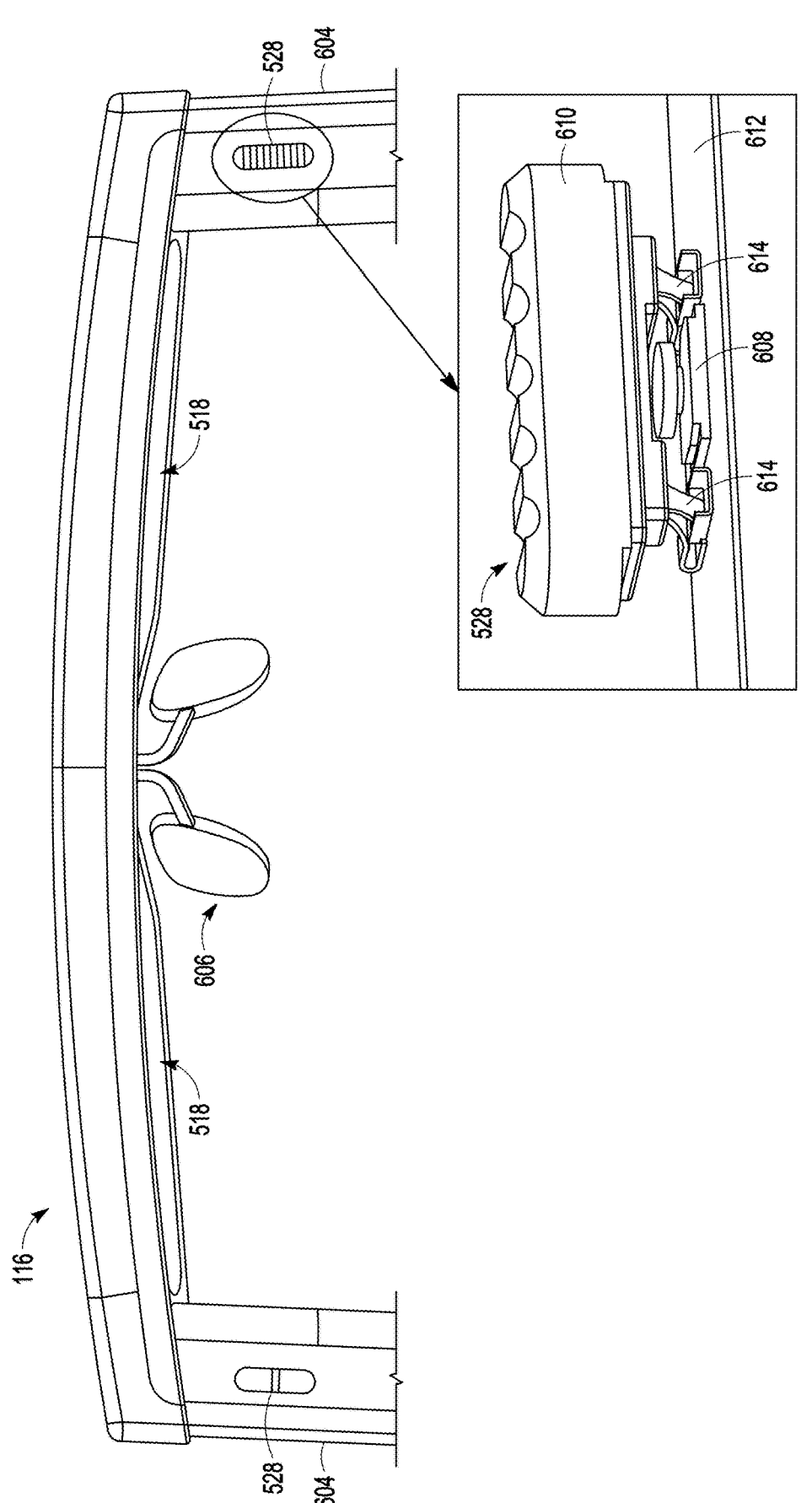
FIG. 6 illustrates a top view of a head-wearable apparatus, according to some examples.

In FIG. 6, an example head-wearable apparatus 116, such as spectacles, is seen in top view. The head-wearable apparatus 116 includes a frame 602 and stems 604 (or temples) extending from a lateral side of the frame 602. In the view, the stems 604 are truncated and in a real-world example would be long enough to extend over the cars of a user wearing the spectacles for example. The head-wearable apparatus 116 includes a nose piece 606.

An image can be presented and viewed by a user wearing the head-wearable apparatus 116 in the image displays of optical assembly 518 of the head-wearable apparatus 116. The image may include augmented or virtual content. The head-wearable apparatus 116 can be used to view augmented content displayed in a content interaction system, such as an augmented reality (AR) or virtual reality (VR) display.

The head-wearable apparatus 116 further includes one or more user input devices 528 (e.g., touch sensors or manual push buttons as shown). The head-wearable apparatus 116 may also include an input surface, such as a touch pad for example (not shown) located on the side of the head-wearable apparatus 116, for example at a convenient location for a user on one or both of the stems 604. In some examples, the user input device 528 (e.g., touch sensor or manual navigation push button) receives input from the user to manipulate the graphical user interface of the presented image, or content presented in the image display of optical assembly 518. As described more fully below, some examples provide the user input device 528 with multipurpose capability for charging and data access. The enabled data access allows the performance of software updates for the head-wearable apparatus 116, debugging of the head-wearable apparatus 116, and other data access operations. In the following descriptions, a user input device 528 will be referred to for clarity of explanation in a non-limiting way as a push button 528. Other implementations, configurations and types of user input device 528 are possible.

The illustrated head-wearable apparatus 116 in this example has two push buttons 528, one on the left side and one on the right side of the head-wearable apparatus 116, as shown. The push button 528 on the right has a knurled or corrugated upper surface. This textured finish or uneven surface topography may improve finger or cable engagement or case of manipulation of the push button 528 for a user. The upper surface of the push button 528 on the left is by contrast flat. This flatness may lend a smoother tactile feel to the push button 528. Both upper surfaces of the respective push buttons 528 may be smooth, or both may be knurled or corrugated.

In some examples, one or both of the push buttons 528 can be pushed or depressed to receive from the user an input selection to manipulate an aspect of the graphical user interface of the presented image in the image display of optical assembly 518. In some examples, the push button 528 can be manually depressed or manipulated by a user to invoke operation of a camera of the head-wearable apparatus 116, such as the visible light camera 506, the infrared emitter 508, or the infrared camera 510. Operation of a camera or other navigation in the graphical user interface of the image display of optical assembly 518 may be invoked based on a predetermined sequence or pattern of one or more pushes of one or both of the push buttons 528, or by depressing either of the push buttons 528 or both simultaneously for a predetermined period of time, or longer. Other types of navigations, sequences, and patterns are possible.

With reference to the enlarged view in FIG. 6, when used for navigation or invoking an application or function, a manual downward push or depression of a push button 528 operates a switch 608. The switch 608 is surface mounted on a printed circuit board (PCB) 612 located within a stem 604 of the head-wearable apparatus 116. The switch 608 is connected to control circuitry (e.g., the low-power circuitry 524, or the high-speed circuitry 526) of the head-wearable apparatus 116 to invoke navigation or camera actions as described above, for example. Other navigation or application invocations are possible.

In this example, a cosmetic body 610 of the push button 528 is used as a charging contact for charging applications. The body 610 (and the similar bodies described further below in other examples) may have an overall rectangular configuration, having rounded corners and/or shoulders, as shown. Other configurations and shapes of the body 610 are possible. In some examples, the push buttons 528 are made out of or include ferromagnetic metal (for example, iron) that is coated with highly conductive metal (for example, nickel).

Spring contacts 614 provide electrical connection from the body 610 to the PCB 612. The spring contacts 614 are provided in cantilever form as shown and bias the body 610 of the push button 528 upwardly. After a user depression or push, the push button 528 springs back up again.

A charging cable or contact (not shown) may be mated or mounted to each push button 528 when needed for charging of the head-wearable apparatus 116. In this example, one push button 528 (e.g., the left side) is used for ground connection and the other push button 528 (e.g, the right side, or vice versa) is used to apply a charging voltage or power to the head-wearable apparatus 116, such as 5V active connection, for example. The PCB 612 of the head-wearable apparatus 116 is powered by batteries (not shown) that can be recharged by connecting a pair of charging cables or contacts (one cable or contact to each push button 528) to direct a charging voltage to the batteries. A pair of charging contacts may be provided in a charging cradle for example. A mating charging cable may include magnets for detachable alignment and retention with a push button 528.

Figure 7:
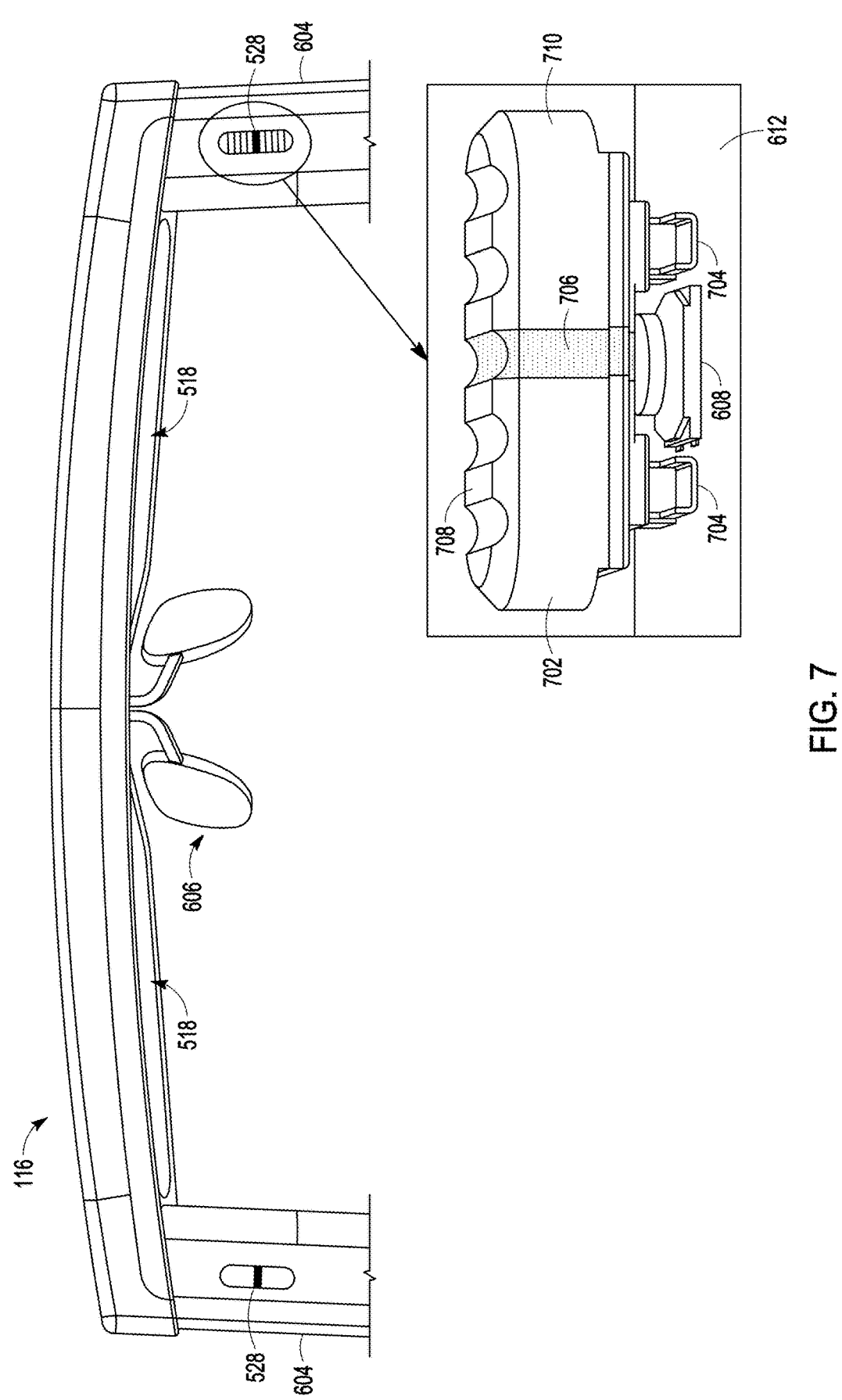
FIG. 7 illustrates a top view of a head-wearable apparatus, according to some further examples.

With reference to FIG. 7, an example head-wearable apparatus 116, such as spectacles, is seen in top view. The head-wearable apparatus 116 again includes a frame 602 and stems 604 (or temples) extending from a lateral side of the frame 602. As before, the stems 604 are truncated and in a real-world example would be long enough to extend over the cars of a user wearing the spectacles for example. The head-wearable apparatus 116 includes a nose piece 606.

An image can be presented and viewed by a user wearing the head-wearable apparatus 116 in the image displays of optical assembly 518 of the head-wearable apparatus 116. The image may include augmented or virtual content. The head-wearable apparatus 116 can be used to view augmented content displayed in a content interaction system, such as an augmented reality (AR) or virtual reality (VR) display.

As before, the head-wearable apparatus 116 has two push buttons 528, one on the left side and one on the right side if the head-wearable apparatus 116. Here, either push button 528 alone can be used for charging as described more fully below.

When used for navigation or invoking an application or function, a manual downward push or depression of a push button 528 again operates a switch 608. The switch 608 is surface mounted on a printed circuit board (PCB) 612 located within a stem 604 of the head-wearable apparatus 116. The switch 608 is connected to control circuitry (e.g., the low-power circuitry 524, or the high-speed circuitry 526) of the head-wearable apparatus 116 to invoke navigation or camera actions as described above, for example. Other navigation or application invocations are possible.

Here, a cosmetic body 702 of a single push button 528 is configured for use as a composite charging contact for charging applications. A separator 706 divides the body 702 of the push button 528 into two charging contacts or areas, shown as first charging contact 708 and second charging contact 710. The separator 706 may include a plastic or dielectric material to separate the body 702 into the two charging contacts, as shown. Other separator and dielectric configurations are possible. For example, the separator 706 may run horizontally (in the view) to divide the body 702 electrically into two upper and lower electrical contacts or partitions with appropriate modifications to the connected navigation circuitry and charging circuits. The separator 706 may be thinner or fatter, or of different shape, to suit various charging configurations or requirements, and/or charging cable designs and connector configurations.

In some examples, the push buttons 528 are made out of or include ferromagnetic metal (for example, iron) that is coated with highly conductive metal (for example, nickel). Spring contacts 704 provide electrical connection from the body 702 to the PCB 612. The spring contacts 704 are provided in cantilever form as shown and bias the body 702 of the push button 528 upwardly. After a user depression or push, the push button 528 springs back up again. A single charging cable or contact (not shown) may be mated or mounted to either push button 528 to enable charging. In this example, one of the charging contacts of the push button 528, for example the first charging contact 708 and connected spring contact 704, is used for ground connection and the other charging contact, for example the second charging contact 710 and the connected spring contact 704, is used to apply a charging voltage or power to the head-wearable apparatus 116, such as 5V active connection, for example. Other configurations and voltages are possible.

The batteries of the head-wearable apparatus 116 can be recharged by connecting a single charging cable or single-button contact point to a single push button 528 to apply a charging voltage or power to the batteries. Appropriately shaped charging contacts, configured to connect with both the first charging contact 708 and the second charging contact 710 may be provided in a charging cable connector or a cradle for example. A single mating charging cable may include magnets for detachable alignment and retention with a single push button 528, or either of the push buttons 528.

Figure 8:
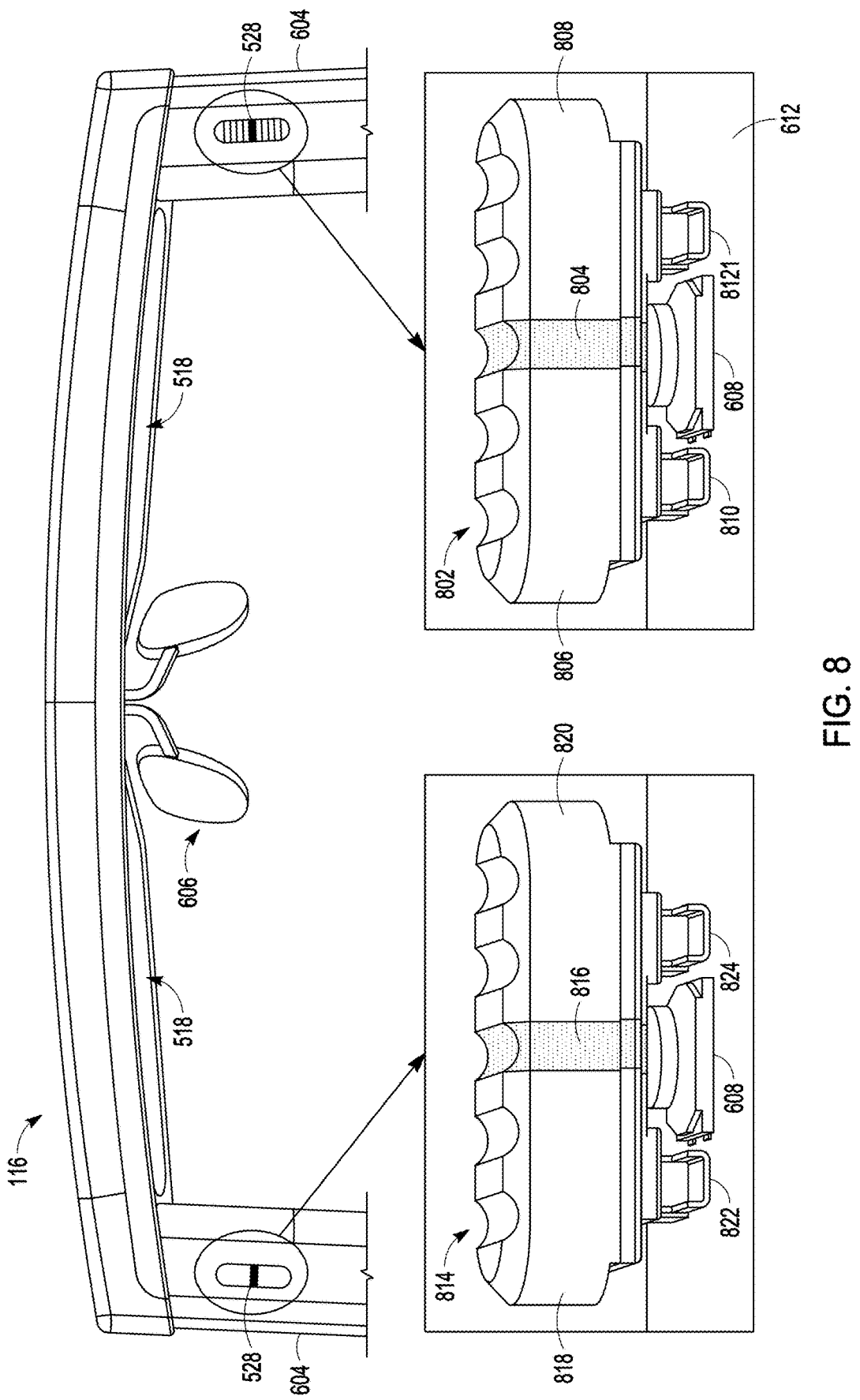
FIG. 8 illustrates a top view of a head-wearable apparatus, according to some further examples.

With reference to FIG. 8, an example head-wearable apparatus 116, such as spectacles, is seen in top view. The head-wearable apparatus 116 again includes a frame 602 and stems 604 (or temples) extending from a lateral side of the frame 602. As before, the stems 604 are truncated and in a real-world example would be long enough to extend over the cars of a user wearing the spectacles for example. The head-wearable apparatus 116 includes a nose piece 606.

An image can be presented and viewed by a user wearing the head-wearable apparatus 116 in the image displays of optical assembly 518 of the head-wearable apparatus 116. The image may include augmented or virtual content. The head-wearable apparatus 116 can be used to view augmented content displayed in a content interaction system, such as an augmented reality (AR) or virtual reality (VR) display.

As before, the head-wearable apparatus 116 has two push buttons 528, but here one on the left side of the head-wearable apparatus 116 is configured for charging, while the push button 528 on the right side of the head-wearable apparatus 116 is configured for data access. This orientation may be reversed in some examples, in other words, the left side being configured for data access and the right side configured for charging, as described more fully below. In some examples, the push buttons 528 are made out of or include ferromagnetic metal (for example, iron) that is coated with highly conductive metal (for example, nickel).

When used for navigation or invoking an application or function of the head-wearable apparatus 116, a manual downward push or depression of a push button 528 again operates a switch 608. The switch 608 is surface mounted on a printed circuit board (PCB) 612 located within a stem 604 of the head-wearable apparatus 116. The switch 608 is connected to control circuitry (e.g., the low-power circuitry 524, or the high-speed circuitry 526) of the head-wearable apparatus 116 to invoke navigation or camera actions as described above, for example. Other navigation or application invocations are possible.

Here, a cosmetic body 802 of one of the push buttons 528 (for example the right push button 528 seen in the enlarged view thereof) is configured and used as a composite charging contact for charging applications. A separator 804 divides the body 802 of the push button 528 into two charging contacts or areas, shown for example as a first charging contact 806 and a second charging contact 808. The separator 804 may include a plastic or dielectric material to separate the body 802 into the two charging contacts or sections, as shown. Other separator and dielectric configurations are possible. For example, the separator 804 may run horizontally (in the view) to divide the body 802 electrically into two upper and lower electrical contacts or partitions with appropriate modifications to the connected navigation circuitry and charging circuits. The separator 804 may be thinner or fatter, or of different shape, to suit various charging configurations or requirements, and/or charging cable designs and connector configurations.

Spring contacts 810 and contacts 812 provide electrical connection from the body 802 to the PCB 612. The spring contacts 810 and contacts 812 are provided in cantilever form as shown and bias the body 802 of the push button 528 upwardly (in the view). After a user depression or push, the push button 528 springs back up again. A single charging cable or powered contact (not shown) may be mated or mounted to the right side push button 528 to enable charging. In this example, one of the charging contacts of the push button 528, for example the first charging contact 708 and the connected spring contact 810, is used for ground connection and the other charging contact, for example the second charging contact 710 and the connected spring contact 812, is used to apply a charging voltage or power to the head-wearable apparatus 116, such as 5V active connection, for example. Other charging configurations and voltages are possible.

The batteries of the head-wearable apparatus 116 can be recharged by connecting a single charging cable or single-button contact point to the right side push button 528 to apply a charging voltage or power to the batteries. Appropriately shaped charging contacts, configured to connect with both the first charging contact 806 and the second charging contact 808 may be provided in a charging cable connector or charging cradle for example. A mating charging cable may include magnets for detachable alignment and retention with the right side push button 528.

With reference to the enlarged view of the left side push button 528 in FIG. 8, a cosmetic body 814 of this push button 528 is configured and used as a data access contact for data access applications, such as software updates for the head-wearable apparatus 116, debugging of the head-wearable apparatus 116, synchronization of the head-wearable apparatus 116 with external sources or databases (e.g., database 128 or databases 304), content uploads to the head-wearable apparatus 116, captured content downloads from the head-wearable apparatus 116, and so forth.

A separator 816 divides the body 814 of the push button 528 into two data access contacts or areas, shown for example as a first data access contact 818 and a second data access contact 820. The separator 816 may include a plastic or dielectric material to separate the body 814 into the two data access contacts or sections, as shown. Other separator and dielectric configurations are possible. For example, the separator 816 may run horizontally (in the view) to divide the body 814 electrically into two upper and lower data access contacts or partitions with appropriate modifications to the connected navigation circuitry and data access circuits. The separator 816 may be thinner or fatter, or of different shape, to suit various data access configurations or requirements, and/or data access cable designs and connector configurations.

The spring contact 822 and the contact 824 provide data access connection from the body 814 to components on the PCB 612. The spring contact 822 and contact 824 are provided in cantilever form as shown and bias the body 814 of the push button 528 upwardly. After a user depression or push, the push button 528 springs back up again. A single data access cable or contact (not shown) may be mated or mounted to the left side push button 528 to enable data access for the example data access operations listed above. In this example, one of the data access contacts of the left side push button 528, for example the first data access contact 818 and the connected spring contact 822, is used for a "data positive" data access connection, and the other data access contact, for example the second data access contact 820 and the connected spring contact 824, is used to apply a "data negative" data access connection for the head-wearable apparatus 116, for example. Other data access configurations and connectivity arrangements are possible.

Figure 9:
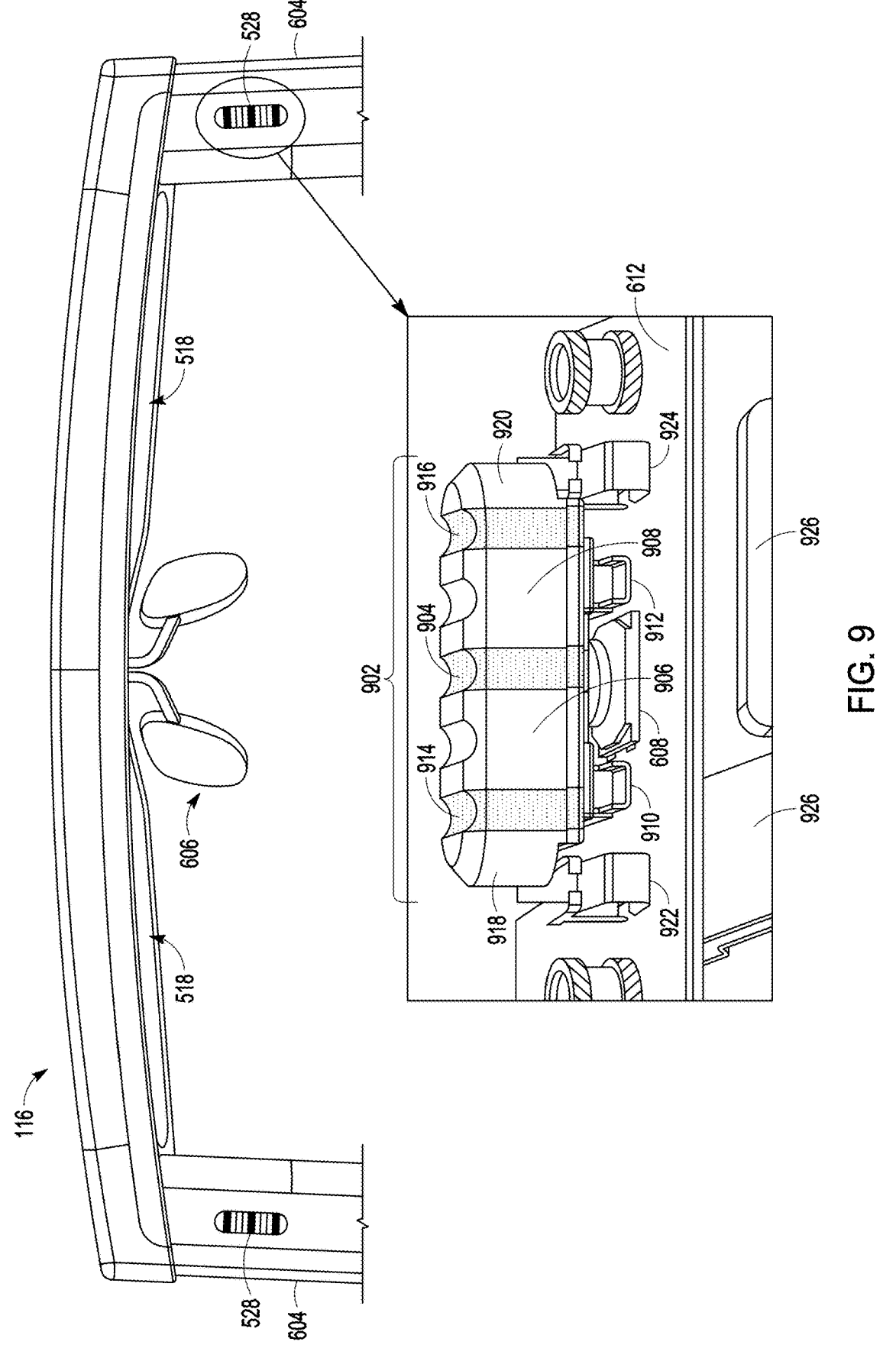
FIG. 9 illustrates a top view of a head-wearable apparatus, according to some further examples.

With reference to FIG. 9, an example head-wearable apparatus 116, such as spectacles, is seen in top view. The head-wearable apparatus 116 again includes a frame 602 and stems 604 (or temples) extending from a lateral side of the frame 602. As before, the stems 604 are truncated and in a real-world example would be long enough to extend over the cars of a user wearing the spectacles for example. The head-wearable apparatus 116 includes a nose piece 606. An image can be presented and viewed by a user wearing the head-wearable apparatus 116 in the image displays of optical assembly 518 of the head-wearable apparatus 116. The image may include augmented or virtual content. The head-wearable apparatus 116 can be used to view augmented content displayed in a content interaction system, such as an augmented reality (AR) or virtual reality (VR) display.

The head-wearable apparatus 116 has two push buttons 528, one on the left side of the head-wearable apparatus 116 and one on the right side of the head-wearable apparatus 116, as shown. Either push button 528 can be used both for charging and data access applications, as described more fully below. In some examples, the push buttons 528 are made out of or include ferromagnetic metal (for example, iron) that is coated with highly conductive metal (for example, nickel).

When used for navigation or invoking an application or function of the head-wearable apparatus 116, a manual downward push or depression of a push button 528 again operates a switch 608. The switch 608 is surface mounted on a printed circuit board (PCB) 612 located within a stem 604 of the head-wearable apparatus 116. The switch 608 is connected to control circuitry (e.g., the low-power circuitry 524, or the high-speed circuitry 526) of the head-wearable apparatus 116 to invoke navigation or camera actions as described above, for example. Other navigation or application invocations are possible.

Here, a cosmetic body 902 of a push button 528 (for example the right side push button 528 seen in the enlarged view thereof) is configured and used for both charging and data access applications. A first separator 904 divides or partitions the body 902 of the push button 528 into two charging contacts or areas, shown for example as a first charging contact 906 and a second charging contact 908. The first separator 904 may include a plastic or dielectric material to separate or partition the body 802 into the two charging contacts or sections, as shown. Other separator and dielectric configurations are possible. For example, the first separator 904 may run horizontally (in the view) to divide the body 902 electrically into two upper and lower electrical charging contacts or partitions with appropriate modifications to the connected navigation circuitry and charging circuits. The first separator 904 may be thinner or fatter, or of different shape, to suit various charging configurations or requirements, and/or charging cable designs and connector configurations.

Spring contacts including contact 910 and contact 912 provide electrical charging connection from the body 902, specifically the respective first charging contact 906 and the second charging contact 908, to the PCB 612. The spring contact 910 and contact 912 are provided in cantilever form as shown and bias the body 902 of the push button 528 upwardly (in the view). Other biasing arrangements are possible. After a user depression, or push, the push button 528 springs back up again. A single charging cable or powered contact (not shown) may be mated or mounted to the right side push button 528 to enable both charging and data access as described below. In this example, one of the charging contacts of the push button 528, for example the first charging contact 906 and the connected spring contact 910, is used for ground connection and the other charging contact, for example the second charging contact 908 and the connected spring contact 912, is used to apply a charging voltage or power to the head-wearable apparatus 116, such as 5V active connection, for example. Other charging configurations and voltages are possible.

The batteries of the head-wearable apparatus 116 can be recharged by connecting a single charging cable or single-button contact point to apply a charging voltage or power to the batteries. Appropriately shaped charging contacts, configured to connect with both the first charging contact 906 and the second charging contact 908 may be provided in a charging cradle for example. A single mating charging cable may include magnets for detachable alignment and retention with the right side push button 528.

For providing data access capability to the same push button 528, the cosmetic body 902 is configured and used as a data access contact for data access applications, such as software updates for the head-wearable apparatus 116, debugging of the head-wearable apparatus 116, synchronization of the head-wearable apparatus 116 with external sources or databases (e.g., database 128 or databases 304), content uploads to the head-wearable apparatus 116, captured content downloads from the head-wearable apparatus 116, and so forth.

A second separator 914 and a third separator 916 further divide or partition the body 902 of the push button 528 into two data access contacts or areas, shown for example as a first data access contact 918 and a second data access contact 920. The second separator 914 and the third separator 916 may each include a plastic or dielectric material to separate the body 902 into the two data access contacts or sections, as shown. Other separator and dielectric configurations are possible. For example, the second separator 914 and the third separator 916 may run horizontally (in the view) to divide the body 902 electrically into two upper and lower data access contacts or partitions with appropriate modifications to the connected navigation circuitry and data access circuits. Other charging and data access contacts and partitioning are possible. For example, the illustrated first charging contact 906 and second charging contact 908 are located inside or within the first data access contact 918 and the second data access contact 920 in the body 902. The opposite configurations, for example with the charging contacts positioned outside of the body 902, is possible. The second separator 914 and the third separator 916 may be thinner or fatter, or of different shape, to suit various data access configurations or requirements, and/or data access cable designs and connector configurations.

Spring contacts including the contact 922 and the contact 924 provide data access connection from the body 902, more specifically the first data access contact 918 and the second data access contact 920, to components on the PCB 612, or components 926 connected to the PCB 612. The spring contact 922 and contact 924 are provided in cantilever form as shown and bias the body 902 of the push button 528 upwardly (in the view). After a user depression, or push, the push button 528 springs back up again. In this example, one of the data access contacts of the push button 528, for example the first data access contact 918 and the connected spring contact 922, is used for a "data positive" access connection, and the other data access contact, for example the second data access contact 920 and the connected spring contact 924, is used to apply a "data negative" access connection for the head-wearable apparatus 116, for example. Other data access configurations and connectivity arrangements are possible.

The same single charging and data access cable or contact as mentioned above may be mated or mounted to the push button 528 to enable both charging and data access for the example charging and data access operations listed above. A push button 528 can operate in different modes and respond, accordingly. In "normal" mode when unconnected, a push button 528 operates to provide navigation and application-invocation functions, for example as described above. When connected, a push button 528 operates to provide charging and data access functions, for example as described above. The charging and data access functions can be performed simultaneously. When a push button 528 is connected to a charging/data access cable, some lines in the cable serve to apply charging voltage to the head-wearable apparatus 116 while other cable lines simultaneously allow data access for the head-wearable apparatus 116 via the same connected push button 528.

Figure 10:
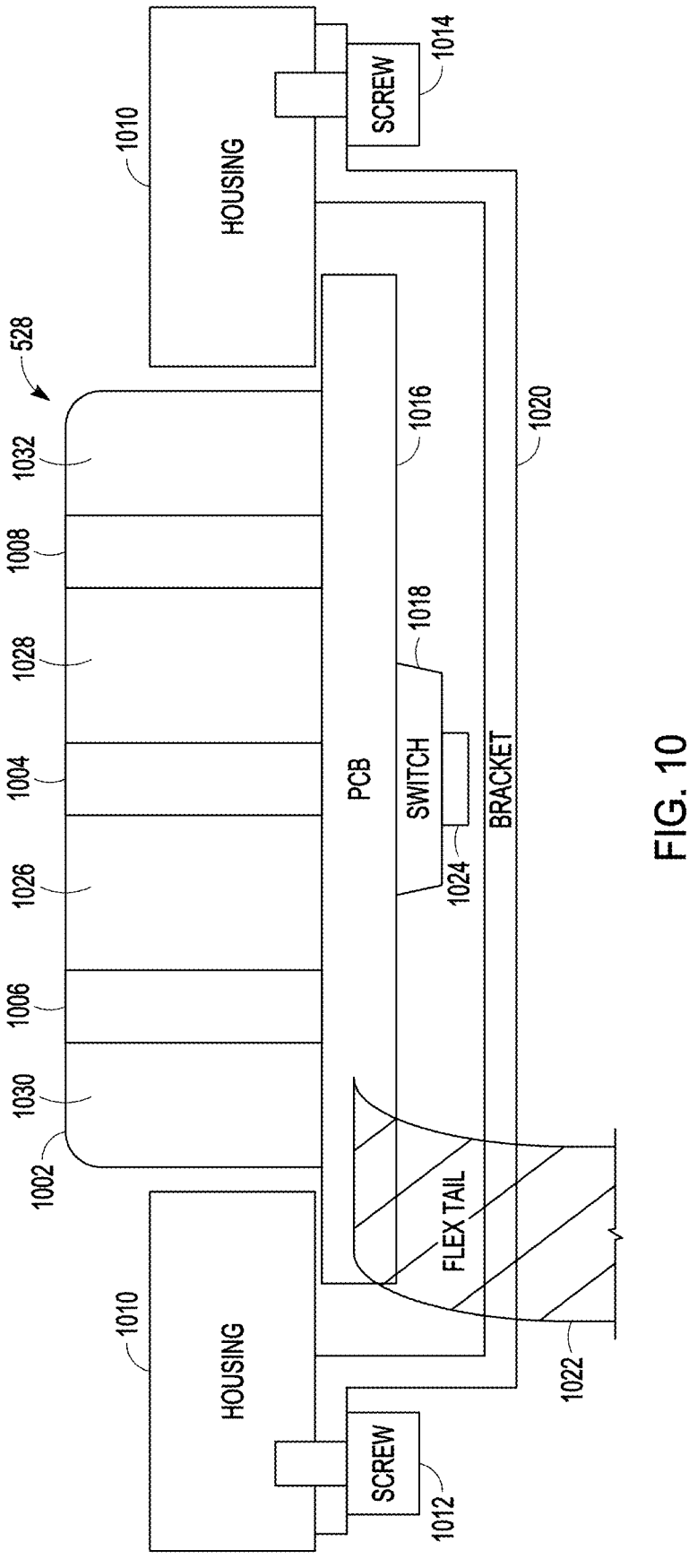
FIG. 10 illustrates a cross sectional view of a user input device, according to some examples.

Reference is now made to FIG. 10. Here, a user input device 528 is again referred to as a push button. The push button 528 includes a body 1002. The body 1002 is movably supported in a housing 1010 located within a stem 604 or frame 602 of the head-wearable apparatus 116, for example. In some examples, the housing 1010 is supported by a bracket 1020 and attached thereto by screws 1012 as shown, for example. When used for navigation or invoking an application or function of the head-wearable apparatus 116, a manual downward push or depression of a push button 528 operates a switch 1018. When operated, the switch 1018 may (or may not) make electrical or grounding contact with the bracket 1020 via a connector 1024.

The switch 1018 is surface mounted on the underside of a printed circuit board (PCB) 1016. As shown, the PCB 1016 is supported by the housing 1010, but other configurations or locations are possible within a stem 604 or frame 602 of the head-wearable apparatus 116. Other locations of the push button 528 are also possible. The switch 1018 is connected to control circuitry (e.g., the low-power circuitry 524, or the high-speed circuitry 526) of the head-wearable apparatus 116 to invoke navigation or camera actions as described above, for example. Other navigation or application invocations are possible.

The body 1002 includes a first separator 1004, a second separator 1006, and a third separator 1008 which in some examples divide or partition the body 1002 into separate electrical regions for charging and data access, as described for example with reference to FIG. 9 above.

The first separator 1004 divides or partitions the body 1002 of the push button 528 into two charging contacts or areas, shown for example as a first charging contact 1026 and a second charging contact 1028. The first separator 1004 may include a plastic or dielectric material to separate or partition the body 1002 into the two charging contacts or sections, as shown. Other separator and dielectric configurations are possible. For example, the first separator 1004 may run horizontally (in the view) to divide the body 1002 electrically into two upper and lower electrical charging contacts or partitions with appropriate modifications to the connected navigation circuitry and charging circuits. The first separator 1004 may be thinner or fatter, or of different shape, to suit various charging configurations or requirements, and/or charging cable designs and connector configurations.

Instead of spring contacts as described above in the various examples, a flex tail 1022 is provided. The flex tail 1022 is connected to the PCB 1016 and includes charging and data access lines connected to the first charging contact 1026 and second charging contact 1028 (and the first data access contact 1030 ad second data access contact 1032 described further below).

A single charging cable or powered contact (not shown) may be mated or mounted to the push button 528 to enable charging and data access as described below. In this example, one of the charging contacts of the push button

528, for example the first charging contact 1026 and the connected flex tail 1022, is used for ground connection and the other charging contact, for example the second charging contact 1028 and the connected flex tail 1022, is used to apply a charging voltage or power to the head-wearable apparatus 116, such as 5V active connection, for example. Other charging configurations and voltages are possible.

The batteries of the head-wearable apparatus 116 can be recharged by connecting a single charging cable or single-button contact point to apply a charging voltage or power to the batteries. Appropriately shaped charging contacts, configured to connect with the body 1002 thereby to engage both the first charging contact 1026 and the second charging contact 1028 may be provided in a charging cradle or cable connector for example. A single mating charging cable may include magnets for detachable alignment and retention with the push button 528.

For providing data access capability to the same push button 528, the body 1002 is also configured and used as a data access contact for data access applications, such as software updates for the head-wearable apparatus 116, debugging of the head-wearable apparatus 116, synchronization of the head-wearable apparatus 116 with external sources or databases (e.g., database 128 or databases 304), content uploads to the head-wearable apparatus 116, captured content downloads from the head-wearable apparatus 116, and so forth.

The second separator 1006 and the third separator 1008 further divide or partition the body 1002 of the push button 528 into two data access contacts or areas, shown for example by the first data access contact 1030 and the second data access contact 1032. The second separator 1006 and the third separator 1008 may each include a plastic or dielectric material to separate the body 1002 further into two data access contacts or sections, as shown. Other separator and dielectric configurations are possible. For example, the second separator 1006 and the third separator 1008 may run horizontally (in the view) to divide the body 1002 electrically into two upper and lower data access contacts or partitions with appropriate modifications to the connected navigation circuitry and data access circuits.

Other charging and data access contacts and partitioning of the body 1002 are possible. For example, the illustrated first data access contact 1030 and second data access contact 1032 are located inside or within the first data access contact 1030 and the second data access contact 1032 in the body 1002. The opposite configuration, for example with the charging contacts positioned outside of the body 1002, is possible. The second separator 1006 and the third separator 1008 may be thinner or fatter, or of different shape, to suit various data access configurations or requirements, and/or data access cable designs and connector configurations.

Here the flex tail 1022 provides data access connection from and to the body 1002, more specifically the first data access contact 1030 and the second data access contact 1032, to components on the PCB 1016, or components connected to the PCB 1016. In this example, one of the data access contacts of the push button 528, for example the first data access contact 1030 and the connected flex tail 1022, is used for a "data positive" access connection, and the other data access contact, for example the second data access contact 1032 and the connected flex tail 1022, is used to apply a "data negative" access connection for the head-wearable apparatus 116, for example. Other data access configurations and connectivity arrangements are possible.

A single charging and data access cable or contact as mentioned above may be mated or mounted to the push button 528 to enable both charging and data access for the example charging and data access operations listed above. A push button 528 can operate in different modes and respond, accordingly. In "normal" mode when unconnected, a push button 528 can be manipulated (pushed or depressed, for example) to provide navigation and application-invocation functions, for example as described above. When connected, a push button 528 can operate to provide charging and data access functions, for example as described above. The charging and data access functions can be performed simultaneously. When a push button 528 is connected to a charging/data access cable, some lines in the cable serve to apply charging voltage to the head-wearable apparatus 116 while other cable lines simultaneously allow data access for the head-wearable apparatus 116 via the same connected push button 528.

Machine Architecture

Figure 11:
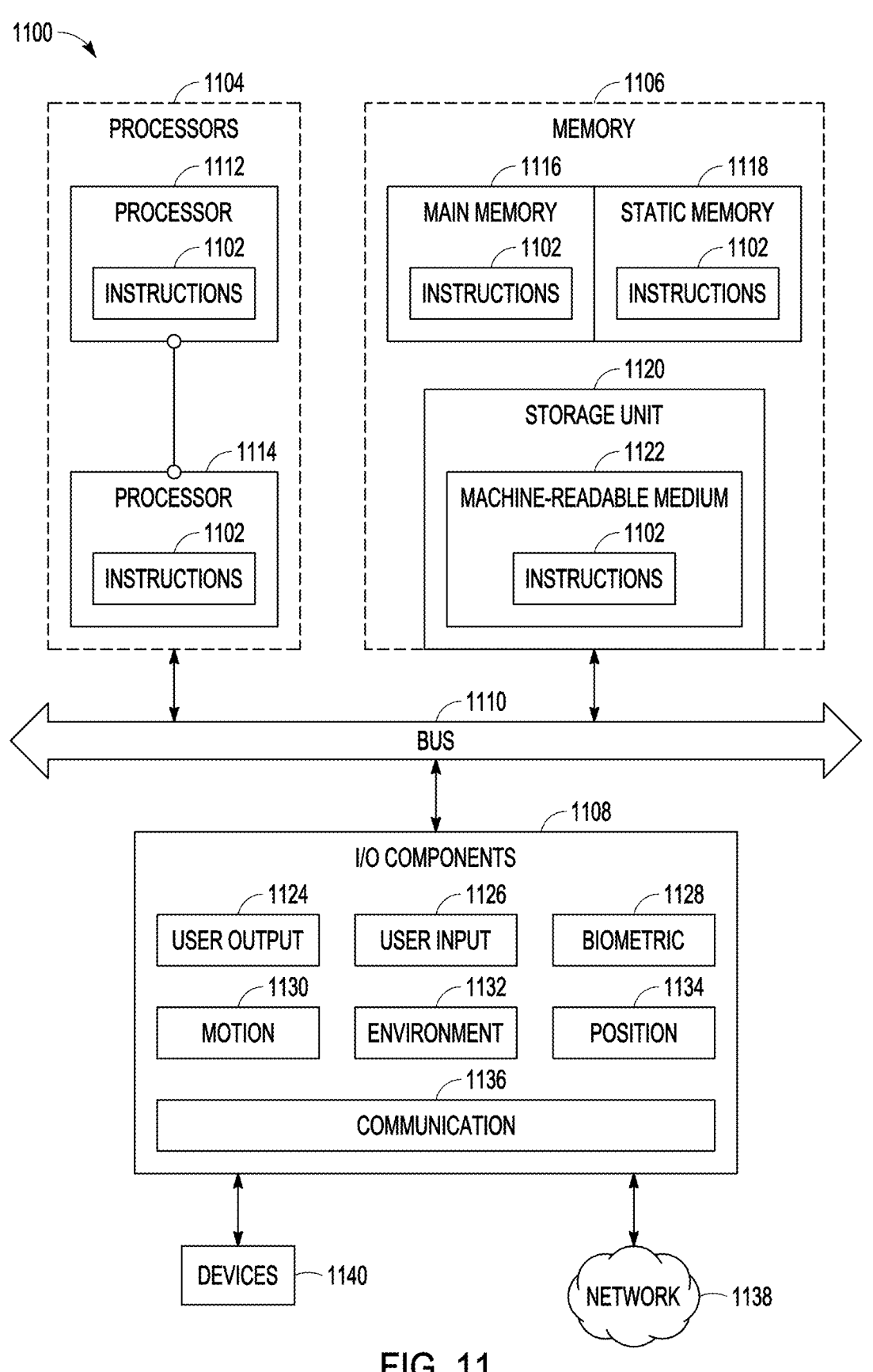
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine "shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:

Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
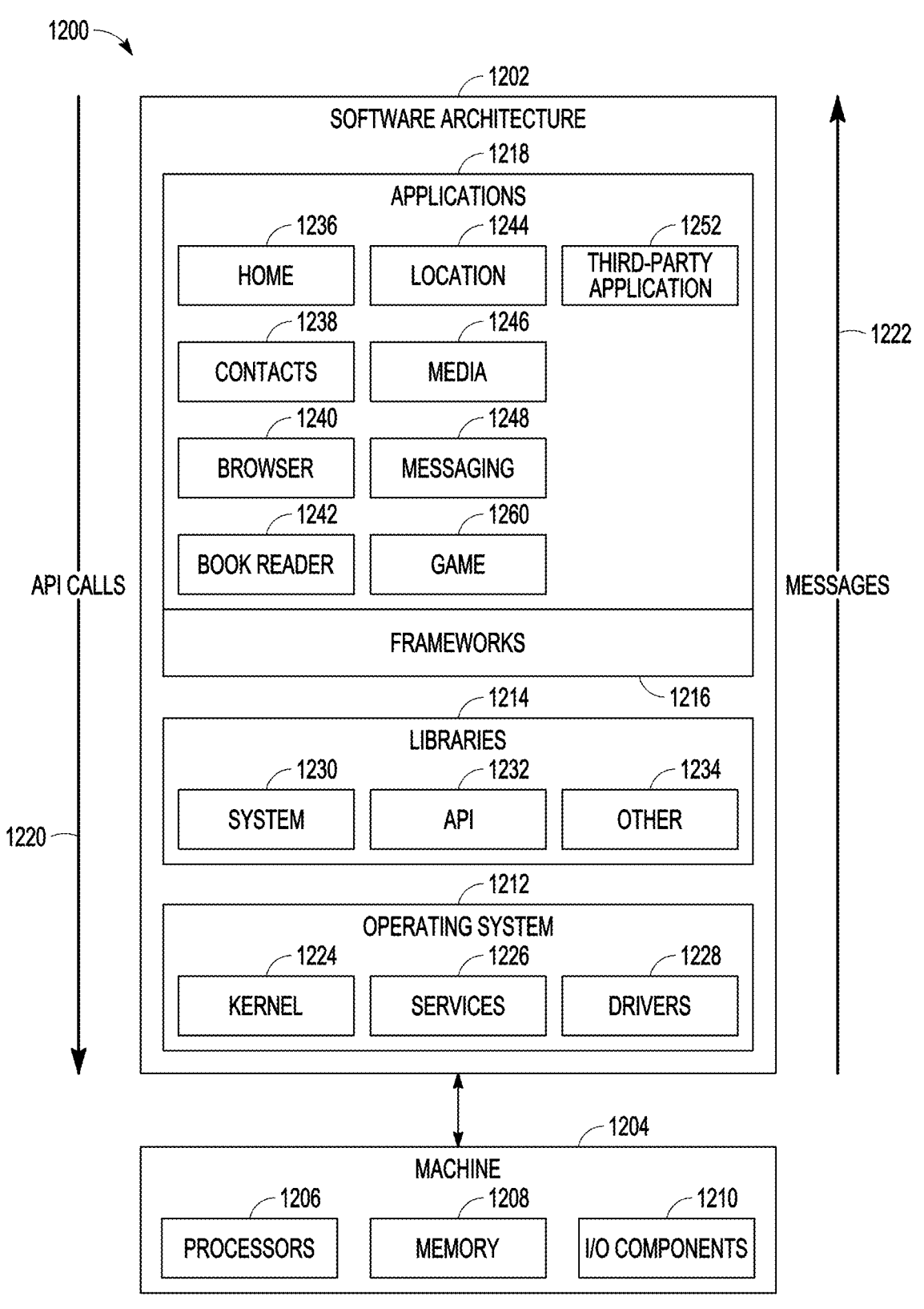
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

EXAMPLES

Example 1 includes a head-wearable apparatus for viewing augmented reality (AR) or virtual reality (VR) content, the apparatus comprising: a frame; an optical assembly including an image display in which the AR or VR content may be viewed by a user; and a user input device operable by the user to navigate through content viewed in the image display, or to invoke a function of the head-wearable apparatus, the user input device including: a body manually engageable by the user to perform a content navigation or function invocation operation, wherein the body of the user input device is configured to present at least one contact for accepting a connection to an external charging source, or a connection to an external device.

Example 2 includes the subject matter of Examiner 1, wherein the user input device is or includes a push button.

Example 3 includes the subject matter of Example 1 or Example 2, wherein the push button is supported movably on, and resiliently biased by, an electrically conductive support disposed internally of the head-wearable apparatus, the electrically conductive support being brought into electrical communication with the external charging source or device when the external charging source or device is connected to the body of the push button.

Example 4 includes the subject matter of any one of Examples 1-3, wherein the body includes a first separator dividing or partitioning the body of the push button into at least two parts defining respectively a first charging contact and a second charging contact for the head-wearable apparatus.

Example 5 includes the subject matter of any one of Examples 1-4, wherein the body of the push button further includes a second separator dividing or partitioning the body into at least two further parts defining respectively a first data access contact and a second data access contact for the head-wearable apparatus.

Example 6 includes the subject matter of any one of Examples 1-5, wherein the push button is engageable with a mating connection in a charging or data access cable or cradle to receive charging power and/or data for the head-wearable apparatus.

Example 7 includes the subject matter of any one of Examples 1-6, wherein the head-wearable apparatus includes two push buttons, each push button engageable with a mating connection in a charging or data access cable or cradle to receive charging power and/or data for the head-wearable apparatus.

Example 8 includes the subject matter of any one of Examples 1-7, wherein the first data access contact and a second data access contact enable connection of the head-wearable apparatus to a data source for performing at least one of a software update for the head-wearable apparatus, a debugging of the head-wearable apparatus, a synchronization of the head-wearable apparatus, a content upload to the head-wearable apparatus, or a download from the head-wearable apparatus.

Example 9 includes the subject matter of any one of Examples 1-8, wherein the body further comprises a third separator dividing or partitioning the body into the at least two parts defining a first charging contact and a second charging contact for the head-wearable apparatus, or dividing or partitioning the body into the at least two further parts defining a first data access contact and a second data access contact for the head-wearable apparatus.

Example 10 includes the subject matter of any one of Examples 1-9, wherein at least one of the first separator, the second separator, and the third separator includes a plastic or dielectric material.

Example 11 includes the subject matter of any one of Examples 1-10, wherein at least one of the first separator, the second separator, and the third separator is aligned with a transverse plane of the body of the push button.

Example 12 includes the subject matter of any one of Examples 1-11, wherein each of the first separator, the second separator, and the third separator is aligned with a transverse plane of the body of the push button.

Example 13 includes the subject matter of any one of Examples 1-12, wherein the body includes a first separator dividing or partitioning the body of the push button into at least two parts defining respectively a first data access contact and a second data access contact for the head-wearable apparatus.

Example 14 includes the subject matter of any one of Examples 1-13, wherein the push button includes a ferromagnetic metal coated with highly conductive metal.

Example 15 includes the subject matter of any one of Examples 1-14, wherein the head-wearable apparatus includes a pair of spectacles comprising a pair of temples attached to the frame.

Example 16 includes the subject matter of any one of Examples 1-15, wherein the user input device is mounted to a Printed Circuit Board (PCB) mounted in at least one of the pair of temples of the spectacles.

Example 17 includes the subject matter of any one of Examples 1-16, wherein the user input device is connected to a switch in electrical communication with the PCB, and wherein a downward push of the user input device operates the switch.

Example 18 includes the subject matter of any one of Examples 1-17, where the head-wearable apparatus further comprises a noise piece attached to the frame.

Example 19 includes the subject matter of any one of Examples 1-8, wherein the function (or a device) invoked by the user input device includes a camera or camera application.

Example 20 includes the subject matter of any one of Examples 1-19, wherein the camera or camera application invoked by the user input device includes or is associated with a visible light camera, an infrared emitter, or an infrared camera mounted to the head-wearable apparatus.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A head-wearable apparatus for viewing augmented reality (AR) or virtual reality (VR) content, the head-wearable apparatus comprising:
   a frame;
   an optical assembly including an image display in which the AR or VR content may be viewed by a user; and
   a user input device mounted on the frame and operable by the user to navigate through content viewed in the image display, or to invoke a function of the head-wearable apparatus, the user input device including:
   a push button comprising a body manually engageable by the user to perform a content navigation or function invocation operation, wherein the body of the user input device is configured to present at least one contact for accepting a connection to an external charging source, or a connection to an external device, wherein the push button is supported movably on, and resiliently biased by, an electrically conductive support disposed internally of the head-wearable apparatus, the electrically conductive support being brought into electrical communication with the external charging source or device when the external charging source or device is connected to the body of the push button.

2. The head-wearable apparatus of claim 1, wherein the body includes a first separator dividing or partitioning the body of the push button into at least two parts defining respectively a first charging contact and a second charging contact for the head-wearable apparatus.

3. The head-wearable apparatus of claim 2, wherein the body of the push button further includes a second separator dividing or partitioning the body into at least two further parts defining respectively a first data access contact and a second data access contact for the head-wearable apparatus.

4. The head-wearable apparatus of claim 3, wherein the push button is engageable with a mating connection in a charging or data access cable or cradle to receive charging power and/or data for the head-wearable apparatus.

5. The head-wearable apparatus of claim 4, wherein the head-wearable apparatus includes two push buttons, each push button engageable with a mating connection in a charging or data access cable or cradle to receive charging power and/or data for the head-wearable apparatus.

6. The head-wearable apparatus of claim 3, wherein the first data access contact and a second data access contact enable connection of the head-wearable apparatus to a data source for performing at least one of a software update for the head-wearable apparatus, a debugging of the head-wearable apparatus, a synchronization of the head-wearable apparatus, a content upload to the head-wearable apparatus, or a download from the head-wearable apparatus.

7. The head-wearable apparatus of claim 3, wherein the body further comprises a third separator dividing or partitioning the body into the at least two parts defining a first charging contact and a second charging contact for the head-wearable apparatus, or dividing or partitioning the body into the at least two further parts defining a first data access contact and a second data access contact for the head-wearable apparatus.

8. The head-wearable apparatus of claim 7, wherein at least one of the first separator, the second separator, and the third separator includes a plastic or dielectric material.

9. The head-wearable apparatus of claim 7, wherein at least one of the first separator, the second separator, and the third separator is aligned with a transverse plane of the body of the push button.

10. The head-wearable apparatus of claim 9, wherein each of the first separator, the second separator, and the third separator is aligned with a transverse plane of the body of the push button.

11. The head-wearable apparatus of claim 1, wherein the body includes a first separator dividing or partitioning the body of the push button into at least two parts defining respectively a first data access contact and a second data access contact for the head-wearable apparatus.

12. The head-wearable apparatus of claim 1, wherein the push button includes a ferromagnetic metal coated with highly conductive metal.

13. The head-wearable apparatus of claim 1, wherein the head-wearable apparatus includes a pair of spectacles comprising a pair of temples attached to the frame.

14. The head-wearable apparatus of claim 13, wherein the user input device is mounted to a printed circuit board (PCB) mounted in at least one of the pair of temples of the spectacles.

15. The head-wearable apparatus of claim 14, wherein the user input device is connected to a switch in electrical communication with the PCB, and wherein a downward push of the user input device operates the switch.

16. The head-wearable apparatus of claim 1, further comprising a nose piece attached to the frame.

17. A head-wearable apparatus for viewing augmented reality (AR) or virtual reality (VR) content, the head-wearable apparatus comprising:
   a frame;
   an optical assembly including an image display in which the AR or VR content may be viewed by a user; and
   a user input device operable by the user to navigate through content viewed in the image display, or to invoke a function of the head-wearable apparatus, the user input device including:
   a body manually engageable by the user to perform a content navigation or function invocation operation,
   wherein the body of the user input device is configured to present at least one contact for accepting a connection to an external charging source, or a connection to an external device, and
   wherein the body is supported movably on, and resiliently biased by, an electrically conductive support disposed internally of the head-wearable apparatus, the electrically conductive support being brought into electrical communication with the external charging source or device when the external charging source or device is connected to the body.

18. A head-wearable apparatus for viewing augmented reality (AR) or virtual reality (VR) content, the head-wearable apparatus comprising:
   a frame;
   an optical assembly including an image display in which the AR or VR content may be viewed by a user; and
   a user input device operable by the user to navigate through content viewed in the image display, or to invoke a function of the head-wearable apparatus, the user input device including:
   a body manually engageable by the user to perform a content navigation or function invocation operation, wherein the body of the user input device is configured to present at least one contact for accepting a connection to an external charging source, or a connection to an external device, and wherein the body includes a first separator dividing or partitioning the body into at least two parts defining respectively a first charging contact and a second charging contact for the head-wearable apparatus.

* * * * *